Dec. 29, 1959

A. LISSANCE 2,918,823

VARIABLE RATCHET DRIVE AND THE LIKE

Filed Feb. 14, 1958

INVENTOR.
Alexander Lissance
BY Edwin Lengel
Harry Cole
ATTORNEYS

Dec. 29, 1959  A. LISSANCE  2,918,823
VARIABLE RATCHET DRIVE AND THE LIKE
Filed Feb. 14, 1958  3 Sheets-Sheet 2

INVENTOR.
Alexander Lissance
BY
ATTORNEYS

Dec. 29, 1959     A. LISSANCE     2,918,823
VARIABLE RATCHET DRIVE AND THE LIKE
Filed Feb. 14, 1958     3 Sheets-Sheet 3
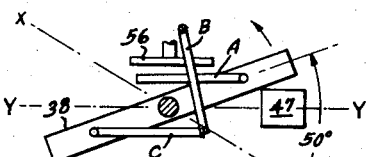
FIG. 6
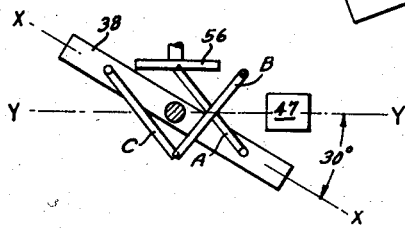
FIG. 5
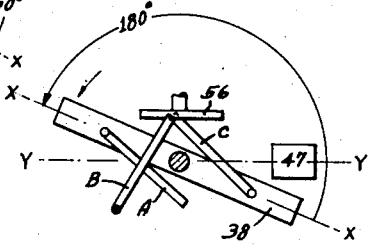
FIG. 8
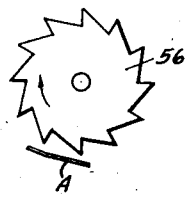
FIG. 7
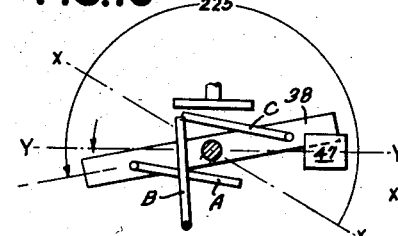
FIG. 10
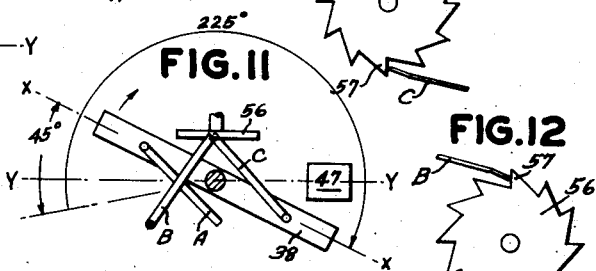
FIG. 11
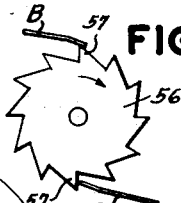
FIG. 9
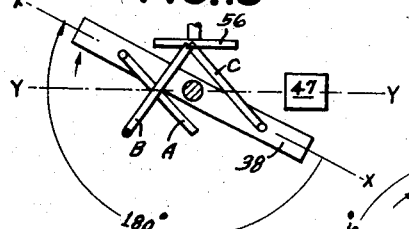
FIG. 15
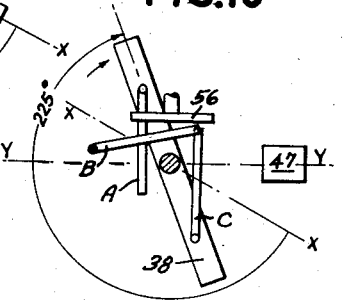
FIG. 16
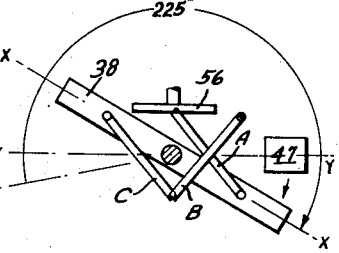
FIG. 13
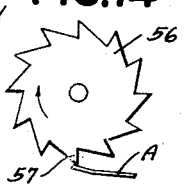
FIG. 14
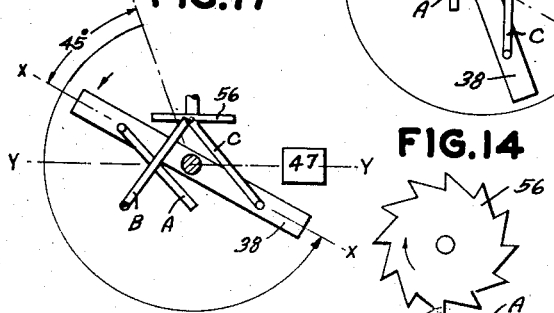
FIG. 17
FIG. 12
INVENTOR.
Alexander Lissance
BY
ATTORNEYS United States Patent Office 2,918,823
Patented Dec. 29, 1959

2,918,823

VARIABLE RATCHET DRIVE AND THE LIKE

Alexander Lissance, New York, N.Y.

Application February 14, 1958, Serial No. 715,275

11 Claims. (Cl. 74—143)

The present invention relates in general to driving means for recording apparatus or the like, capable of operating with low power requirements and capable of functioning for long periods of time without being attended to.

The main object of the present invention is the provision of a ratchet drive wherein a ratchet wheel is actuated by spring actuating members mounted for oscillatory movement with a balance operated spindle, and wherein a plurality of movements of rotation are imparted to the ratchet wheel by the actuating members during each complete oscillation.

In prior art driving means of the type described, a single cycle of spindle oscillation has been operative to impart usually only one, and occasionally two movements of rotation to the ratchet wheel. According to the present invention, a single complete oscillation is capable of imparting to the ratchet wheel one, four, five or seven movements of rotation. Such is accomplished by increasing the amplitude of oscillation of the spindle and by utilizing a plurality of ratchet wheel actuating springs.

Another object of the invention is the provision of a ratchet drive having electromagnetic means which are operative to give periodic electrical impulses in order to make the ratchet drive self starting and to maintain the oscillations.

A further object of the invention is the provision of an impulse driven ratchet drive capable of providing a selected one of a plurality of output speeds of rotation.

According to another feature of the invention, there is provided in a variable speed ratchet drive switch means for changing the output rotational speed thereof.

Another object of the invention is the provision of ratchet driving means having a constant speed of rotation irrespective of substantial variation in oscillation amplitude.

Another object of the present invention is the provision of a ratchet drive wherein no load is applied to the oscillating parts for a substantial travel thereof from the initial rest position.

The above and other objects, features and advantages of the present invention will be more fully understood from the following description considered in connection with the accompanying illustrative drawings, in which Fig. 1 shows a diagrammatic perspective view of a recording apparatus embodying the ratchet drive means of the present invention;

Figs. 5-17 are diagrammatic representations of one embodiment of the ratchet drive illustrating one mode of operation thereof;

Figure 1:
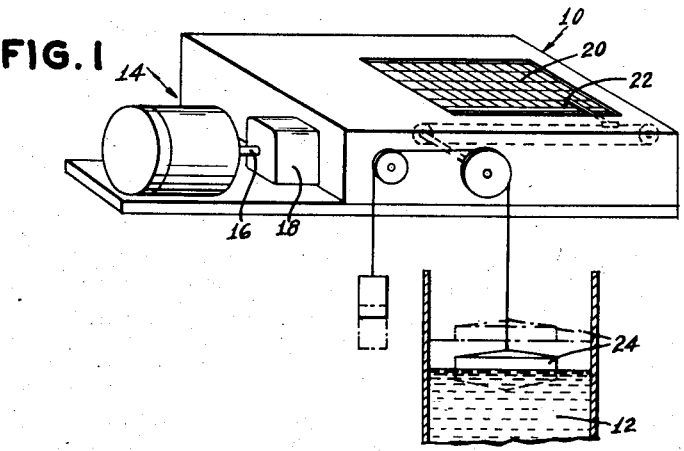

Referring to Fig. 1, there is shown a recorder 10 adapted to record the liquid level of a body of water 12. The driving means for said recorder comprises a ratchet wheel drive 14 having an output shaft 16. The torque of output shaft 16 is transmited through a gear train in gear box 18 for driving a chart 20 past a stylus 22, the latter being operatively connected to a float 24. In operation, recorder 10 produces a graphic record of water levels against time. The stylus moves horizontally over the width of the chart proportionally to changes in water level, while the chart moves past the stylus at a rate controlled by the ratchet wheel drive 14, as will hereinafter be described in greater detail.

Figure 2:
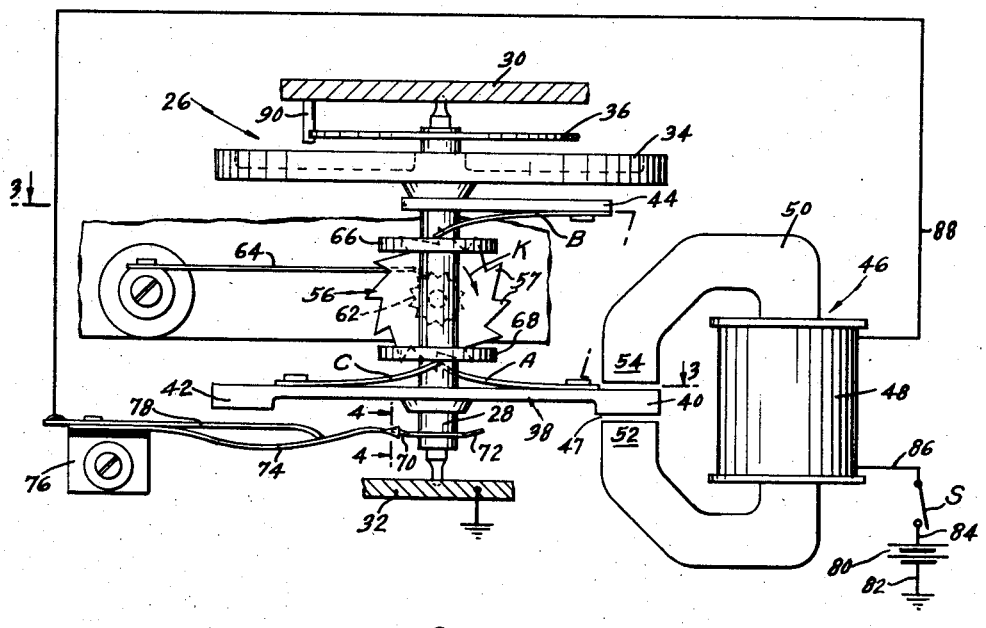
Fig. 2 is a fragmentary sectional view, with parts broken away, of the ratchet drive according to the invention.
Figure 3:
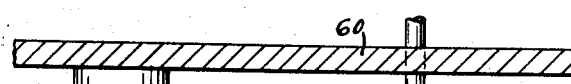
Fig. 3 is a section along 3—3 of Fig. 2.

Referring now to Figures 2 and 3, there is shown one embodiment 26 of the ratchet drive referred to above, according to the invention. A spindle 28 is mounted for rotation in bearings in frame parts 30 and 32. This spindle carries a balance wheel 34 coacting with a spiral spring 36, an armature 38 provided with end portions 40 and 42, and an arm 44. Armature 38 forms part of an electro-magnet 46, having a coil 48 and a core 50 provided with poles 52 and 54.

The armature 38, which is secured to the spindle 28 mounts a pair of ratchet actuating springs A and C symmetrically disposed about the spindle. The arm 44 which is secured to said spindle, is provided with a ratchet actuating spring B, similar to springs A and C.

These ratchet actuating springs A, B and C, are adapted to engage a ratchet wheel 56 disposed in a plane extending parallel to the axis of the spindle, as will hereinafter be explained in greater detail. Ratchet wheel 56 is mounted on a shaft 16 which is pivotally supported in frame parts 60 and 61, said shaft also being shown in Fig. 1. A toothed wheel 62 having the same number of teeth as ratchet wheel 56 is fixedly mounted on shaft 16 and cooperates with a stop pawl 64 to control the amount of ratchet wheel rotation caused by the engagement thereof with the ratchet actuating springs, and to prevent backward movement of said ratchet wheel. When the ratchet wheel 56 is given a movement of rotation by one of the aforementioned ratchet actuating springs, ratchet wheel 56 and toothed wheel 62 are rotated a sufficient amount so that the stop pawl 64 is lifted just over the top of a tooth of toothed wheel 62. The pressure of the pawl on said tooth snaps the wheel 62 forward an additional amount until said pawl fits in the hollow between the tooth just passed and the next adjacent tooth. Since there are as many teeth on wheel 62 as there are on the ratchet wheel, the latter is rotated by this action an angular amount which will cause the radial face of the next ratchet wheel tooth 57 to be parallel to the axis of rotation of the spindle, in the same position occupied by the preceding tooth prior to its being actuated. The free ends of ratchet actuating springs, A, B, and C are inclined towards said ratchet wheel and terminate in end portions bent toward the center of said ratchet wheel so that said end edges $a$, $b$ and $c$, respectively, are at a level to engage the teeth 57 of said ratchet wheel. A pair of spacers 66 and 68 are mounted on spindle 28 and are positioned thereon so as to limit the inward movement of the respective ratchet actuating springs whereby the end portions of said springs remain at the proper level for engaging the ratchet wheel teeth. A pair of outwardly extending contact pins 70 and 72 disposed in diametrically opposite relation are carried by spindle 28, for engagement with a resilient contact blade 74 mounted on an insulated contact block 76. Said contact block also carries a spring blade 78 which bears on the contact blade 74.

A source of electric current constituted by a small electric cell 80 is connected by a conductor 82 to ground, and by a conductor 84 to one terminal of switch S, the other terminal of the switch being connected by conductor 86 to one end of coil 48. The other end of coil 48 is connected by means of conductor 88 to the insulated contact block 76 which carries the resilient contact blade 74.

It is thus seen that with switch S closed, a complete circuit is established when contact blade 74 is contacted by either of the outwardly extending contact pins 70 or 72 carried by the spindle, the spindle being in direct electrical contact with the frame which is grounded.

Usual regulator means having the downwardly extending projection 90 is provided to regulate and adjust the timing of the hair spring 36 and of the balance system.

During oscillation of the spindle 28, the armature 38 and the arm 44, as well as ratchet actuating springs A, B, and C, will turn with said spindle. When the spindle 28 turns in the counter-clockwise direction indicated by the arrow F in Figure 3, springs A and C will sequentially engage ratchet wheel teeth 57, the end edges *a* and *c* respectively, sequentially engaging the radial face of the adjacent ratchet wheel tooth and imparting to ratchet wheel 56 a movement of rotation in the clockwise direction indicated by the arrow K in Figure 2. During this time toothed wheel 62 cooperates with stop pawl 64 to govern the amount of said imparted rotation. Rotation of spindle 28 in the counter-clockwise direction (arrow F in Fig. 3) will also cause the end portion of spring B to slide along the inclined back face of the adjacent ratchet wheel tooth, but said sliding engagement will obviously not impart any movement of rotation to the ratchet wheel.

On the other hand, when the spindle turns in the clockwise direction (as indicated by arrow M in Fig. 3), springs A and C will sequentially engage ratchet wheel 56 but the end portions thereof will merely slide over the inclined back faces of the adjacent ratchet wheel teeth, and no rotation will be imparted to the ratchet wheel. In said clockwise direction of rotation (arrow M in Fig. 3), however, end edge *b* of spring B will engage the radial face of the adjacent ratchet wheel thus imparting to the ratchet wheel a movement of rotation in the clockwise direction indicated by arrow K in Fig. 2.

Thus it is seen that no matter in which direction the spindle turns, rotation of the ratchet wheel is always in the clockwise direction, namely that indicated by the arrow K in Fig. 2, springs A and C being operative to impart rotational movement to the ratchet wheel when the spindle turns in the counter-clockwise direction in Fig. 3, and spring B being operative to impart rotational movement to said ratchet wheel when the spindle turns in the clockwise direction in Fig. 3.

Figures 4, 4A:
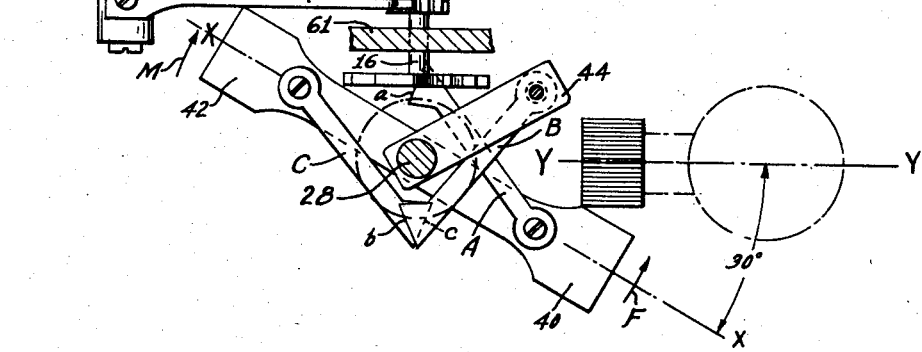
Figs. 4 and 4a is a section along 4—4 of Fig. 2 showing the action of the contact pin with the contact blade as the former engages the latter.

Referring to Figs. 4 and 4A it will be noted that the end portion of contact blade 74 is inclined from the horizontal and accordingly side edge 75 is below side edge 77 of said blade end portion. When spindle 28 is rotated in the counter-clockwise direction in Figure 3, outwardly extending contact pins 70 or 72 will abut against the upper face of the contact blade inclined end portion, as shown in Figure 4. The blade end is positioned downwardly by the pin, and since the end portion of contact blade 74 is biased upwardly, a good contact pressure will be obtained while the outwardly extending pin passes along the upper face of said contact blade end (as shown by the dashed lines), and in that way establishing a complete circuit for energizing coil 48. When the spindle turns in the clockwise direction in Fig. 3, the pin passes below the inclined end portion of the contact blade 74 establishing contact therewith for a negligible distance. Thus it is seen that only when the spindle is turned in the counter-clockwise direction in Figure 3, will there be a complete electrical circuit as the pin 70 or 72 engages the contact blade, said engagement lasting for slightly less than 30° of spindle rotation. Spring 78 limits the upward movement of the contact blade and thereby maintains the end portion of contact blade 74 in the path of the pins.

Figures 2 and 3 show the relative positions of the armature 38, the actuating springs A, B and C, the ratchet wheel 56, pins 70 and 72, and contact blade 74, at the initial rest position of the system determined by the setting and adjustment of the hair spring 36. In this position, ratchet actuating spring A is initiating its engagement with the radial face of the ratchet wheel tooth adjacent thereto, end 40 of armature is about to enter the air gap 47 between the poles of the electromagnet, and contact pin 70 is initiating its contact with contact blade 74. In this position, the system is self-starting and it is only necessary to close switch S to initiate the oscillation of the balance in a counter-clockwise direction. It will be observed that in the position of the system as shown in Figures 2 and 3, the major axis of armature 38 makes an angle of 30° with the central axis Y—Y of the air gap, and said armature major axis coincides with axis X—X indicating the initial orientation of said armature.

Beginning with the initial position as shown in Figure 3, the closing of switch S will complete the electrical circuit and energize coil 48. End 40 of the armature is thereby attracted to the pole faces 52 and 54, giving an impulse to the balance wheel in the counterclockwise direction in Figure 3. A few degrees prior to end 40 being immediately between the pole faces, or prior to the armature axis coinciding with axis Y—Y, pin 70 becomes disengaged from the contact blade 74 and the circuit is opened. In the initial position shown in Figure 3, ratchet actuating spring A is in position to engage the radial face of the adjacent ratchet wheel tooth. Accordingly, when the initial impulse is given as described above, actuating spring A will impart a movement of rotation to the ratchet wheel at the very outset of the rotational movement of the armature 38. Also, assuming for the purpose of explanation that the initial impulse as described above is sufficient in magnitude to cause an angular rotation of the spindle 28 or the armature 38 of at least 180 degrees, it will be apparent that upon such rotation, end 42 of the armature will assume the position which end 40 thereof had initially, as shown in Figure 3. Contact pins 70 and 72 being disposed 180 degrees away from each other it is apparent that contact blade 74 will now be engaged by pin 72, once again completing the circuit to the electro-magnet and once again giving an impulse to the armature which is also transmitted to the balance wheel. Assuming that due to the tensioning of the hair spring, said second impulse will not cause an additional rotation of 180 degrees, the armature will obviously come to a position of rest and return, by virtue of the energy stored in the hair spring, to the initial position (X—X), in a clockwise direction, and further proceed in the clockwise direction past said initial position to an angular displacement from said initial position approximately equal to the displacement from said initial position in the counter-clockwise direction. During said armature travel in the clockwise direction no impulses will be imparted to the balance wheel for the reasons explained above in connection with Figures 4 and 4A. From said maximum angular displacement of the armature in the clockwise direction, the armature will reverse direction and once more rotate in the counter-clockwise direction, and as the respective contact pins 70 and 72 sequentially engage contact blade 74, impulses imparting counter-clockwise rotation to the armature will again be produced.

The detailed operation of the embodiment shown in Figures 2 and 3 will now be described with particular reference to Figs. 5–17. In the ensuing description, the amount of current which flows in coil 48 of the electromagnet 46 is of a magnitude which will cause an initial angular displacement of the armature in the counter-clockwise direction, of approximately 225 degrees, such being accomplished by means of two electrical impulses.

Referring now to Figure 5, there is shown a schematic representation of the armature 38, ratchet actuating springs A, B and C, ratchet wheel 56 and air gap 47, all positioned exactly as shown in Figure 3, such position being the initial position of the system. As has been previously described, in such position there is electrical contact between the contact blade 74 and pin 70. An initial impulse is thereby given to the armature causing said armature to move past the air gap, and Figs. 6 and 7 indicate the relative positions of the parts after there has been a displacement of 50 degrees. As the system has moved from the position shown in Fig. 5 to the position shown in Figure 6 spring A has imparted a movement of rotation (#1) to the ratchet wheel. Additional rotation of the armature under the initial impulse imparted thereto will cause the armature to occupy the position shown in Figure 8, the angular displacement of the armature from the initial position X—X being approximately 180 degrees. A second impulse will then be imparted to the armature, and ratchet actuating spring C will now impart a movement of rotation (#2) to the ratchet wheel while ratchet actuating spring B slides over the adjacent ratchet wheel tooth as shown in Figure 9. The maximum armature displacement (225°) in the counter-clockwise direction is shown in Figure 10. From the position of the system shown in Figure 10, the armature will reverse direction under the action of the hair spring and Figure 11 shows the relative position of the parts after the armature has travelled approximately 45 degrees in a clockwise direction from its position in Figure 10. In said position (Figure 11 and Figure 12) ratchet actuating spring B engages the radial face of the adjacent ratchet wheel tooth and imparts to the latter a movement of rotation (#3) while ratchet actuating spring C slides over the inclined back face of the ratchet wheel tooth adjacent thereto. As the armature continues its clockwise rotation, it returns to the initial position shown by Figure 13, said position being identical to that shown in Figure 5, and ratchet wheel actuating spring A merely sliding over the back face of the ratchet wheel tooth adjacent thereto, as best shown in Figure 14. The inertia of the system causes the armature 38 to continue turning from the position shown in Figure 13, in a clockwise direction, and Figure 15 indicates the relative position of the parts after approximately 180 degrees of travel from the position shown in Figure 13. In this position (Fig. 15) ratchet actuating spring B again engages the radial face of the ratchet wheel tooth adjacent thereto in order to impart to the ratchet wheel a movement of rotation (#4), while spring C merely slides over the back face of the ratchet wheel tooth adjacent thereto. Figure 16 indicates the maximum clockwise position of the relative parts, and from said position the armature once again reverses direction under the action of the hair spring. Fig. 17 shows the relative position of the parts after approximately 45 degrees of armature travel from the position shown in Figure 16. In said position (Figure 17) ratchet wheel actuating spring C engages the radial face of the ratchet wheel tooth adjacent thereto to impart to said ratchet wheel a movement of rotation (#5), and in said position there is also an impulse imparted to the armature. From the position shown in Figure 17 the system returns to its initial position as shown in Figures 3 and 5, and the cycle is complete.

From the foregoing explanation it will be seen that during one complete oscillation of the balance wheel there are imparted to the ratchet wheel 5 movements of rotation, and there are produced during said one cycle three electrical impulses. It will of course be understood that each movement of rotation imparted to the ratchet wheel is of equal angular amount, such being due to the previously described action of toothed wheel 62 cooperating with pawl 64. It will also be remembered that the foregoing description of the operation was in connection with a given amount of current flowing through the electromagnet coil, which current would provide impulses enabling the system to have a displacement of approximately 225 degrees from the initial starting point.

The embodiment of Figs. 2 and 3 can be operated with a larger magnitude current flowing through the electromagnet coil than described above in connection with Figs. 5–17. More specifically, said device can be operated with an electromagnetic coil current of magnitude so as to be capable of providing impulses of sufficient strength to cause an initial displacement of the balance wheel from its initial position, in the counter-clockwise direction, of approximately 405 degrees, such being accomplished with three electrical impulses.

It will be apparent that under such conditions, the following will take place: (a) during the initial counter-clockwise movement of the balance wheel from the starting point to the maximum counterclockwise displacement of 405 degrees spring A will cause actuation #1, spring C will cause actuation #2, and spring A will cause actuation #3; (b) during the return clockwise movement of the balance wheel to the maximum displacement of the balance wheel of 405 degrees in the counter-clockwise direction spring B will cause actuations #4 and #5, and (c) during the return counterclockwise movement of the balance wheel to the starting point spring A will cause actuation #6 and spring C will cause actuation #7.

From the foregoing it will be seen that when the current in the coil is of such magnitude as to enable the balance wheel to oscillate with a 405 degree displacement from the starting point, the ratchet wheel is given a movement of rotation 7 times per cycle.

Referring again to the device shown in Figures 2 and 3, it will be obvious from the foregoing discussion that the magnitude of the current permitted to flow through the magnetic coil will determine the amount of displacement from the initial position, and said amount of displacement will determine the number of movements of rotation per cycle imparted to the ratchet wheel.

Considering now a current flowing through the electromagnet coil of the embodiment of Figs. 2 and 3 which will cause an armature angular displacement from the initial position of only 90°, it will be seen that under such conditions there will be only one actuation per cycle, namely the one caused by ratchet actuating spring A at the very beginning of the cycle.

From the foregoing explanation it will be seen that the embodiment of the invention described in connection with Figures 2 and 3 is capable of providing to the ratchet wheel 56 a plurality of rotational speeds in the ratio of 1:5:7 corresponding to electrical currents flowing through the coil 48 for providing displacements from the initial position of 90°, 225° and 405°, respectively.

Figure 18:
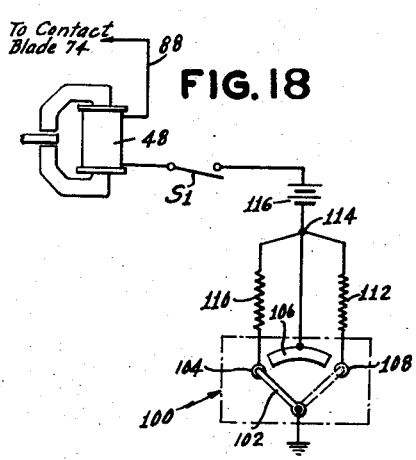
Fig. 18 is a circuit diagram of the speed changing means used in conjunction with the embodiment of the ratchet drive of Figs. 2 and 3.

Referring to Figure 18, there is shown a switching system for use in connection with the previously described apparatus. Switch 100 comprises a movable contact 102, and fixed contacts 104, 106, and 108. Movable contact 102 is grounded at the fixed end thereof. Fixed contact 104 is connected to one end of a resistor 110, the other end of which is connected to terminal 114 at one end of the cell 116. Fixed contact 106 is of arcuate shape and is directly connected to cell terminal 114, and fixed contact 108 is connected to one end of resistor 112, the other end of said resistor being connected to terminal 114 of the cell. The other end of cell 116 is connected to one end of coil 48 by means of starting switch S1, and the other end of coil 48 is connected to contact blade 74. When movable contact 102 is in engagement with fixed contact 104, as shown by the full lines in Figure 18, it will be obvious that resistor 110 is in series with the electro magnet coil. When movable contact 102 is in engagement with fixed arcuate contact 106, it is obvious that there are no resistors in series with the electro magnet coil. When movable contact 102 is in contact with fixed contact 108, as shown by the dashed lines in Figure 18, resistor 112 is in series with the electromagnet coil.

In the circuit arrangement shown in Figure 18, resistor 110 is of a magnitude so as to cause an amount of current to flow through the electro-magnetic coil which will provide to the device 26 of Figs. 2 and 3 impulses of a magnitude to cause a displacement of 90° from the initial starting point, and thus cause the ratchet wheel in said system to have imparted thereto one actuation per cycle. Resistor 112 is of a magnitude so as to cause an amount of current to flow through the electro-magnetic coil which will provide to the devices of Figures 2 and 3 impulses of a magnitude to cause a displacement of 405° from the initial starting point, and thus cause the ratchet wheel in said system to have imparted thereto seven actuations per cycle. It will be apparent that by moving the movable contact 102 from the position indicated by the full lines to the position indicated by the dashed lines in Figure 18, the rotational speed of the ratchet wheel will be multiplied seven fold. It will also be noted that in going from the full line position to the dashed line position, movable contact 102 will be in engagement with arcuate contact 106, during which engagement the current flowing through the coil is at a maximum.

Referring to Fig. 1, the ratchet drive 14 shown therein may be of the construction described above in connection with Figs. 2 and 3. Said ratchet drive 14 may have incorporated therein the circuitry shown and described in connection with Figure 18. Consequently, said ratchet drive is capable of driving chart 20 at a selected one of two speeds depending upon the positioning of movable contact 102 in switch 100. Said movable contact 102 is operatively connected to apparatus (not shown) which is responsive to the rate of change in water level of the body of water. In operation, the movable contact 102 is normally in the position shown by the full lines in Figure 18. When a predetermined rate of change in water level occurs, the responsive apparatus is operative to instantaneously move the movable contact 102 to the position shown by the dashed lines in Figure 18. Consequently, the ratchet wheel will automatically rotate at a speed which is seven times greater, thus causing the recording chart to likewise move seven times faster. In moving from the full line position to the dashed line position of Fig. 18, contact 102 engages momentarily the arcuate contact 106, allowing a momentary surge of current flow through the electro magnet coil 48 so as to enable the system to suddenly multiply its speed seven fold. When the rate of change in water level falls below said predetermined value, the responsive apparatus is operative to instantaneously move movable contact 102 to the position shown by the full lines in Fig. 18, thus automatically returning the ratchet wheel to its normal rotational speed. A sudden increase in output speed will occur as movable contact 102 engages arcuate contact 106 momentarily on its return to its normal position, but such increase is of such short duration as to be of negligible effect.

It is therefore apparent that the variable speed ratchet drive of the embodiment shown in Figs. 2 and 3, when used in conjunction with the switching circuit shown in Figure 18, is operative to automatically drive the recording chart at one of a plurality of speeds, whereby sudden fluctuations in the level of the water will be more clearly distinguishable on the chart since the time axis thereof will be seven times larger. The aforementioned responsive apparatus which automatically actuates movable contact 102 forms no part of this invention but merely demonstrates the use to which variable speed ratchet drive of the present invention can be put to.

Inasmuch as the current requirements for the operation of the device described above are relatively small, it is only necessary to provide a small battery for the operation of the device for a substantial length of time and the said apparatus can operate unattended for a long period of time. In addition, the variable speed aspect of the described invention coupled with the means for automatically switching the device from one speed to another, enables accurate recordation to be accomplished when sudden fluctuations in the level of water occur, such feature also being effectuated while the device is completely unattended.

It will be understood that while the switching system of Figure 18 has been described in connection with resistors which will provide a two speed ratchet drive in the ratio of 1 to 7, different value resistors can be provided so as to have the two speed ratchet drive operate in the ratio of 1 to 5 or 5 to 7.

Figure 19:
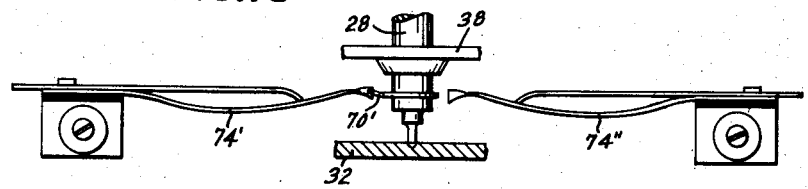
Fig. 19 is a modification of Figure 2.

Referring to Figure 19, there is shown a modification of the ratchet drive of Figs. 2 and 3. Instead of utilizing two contact pins 70 and 72 cooperating with one contact blade 74, as shown in Figs. 2 and 3, the modification shown in Fig. 19 utilizes one contact pin 70' cooperating with two contact blades 74' and 74". The contact blades 74' and 74" are identical in construction to contact blade 74, and contact pin 70' is identical in construction to contact pin 70.

Figure 20:
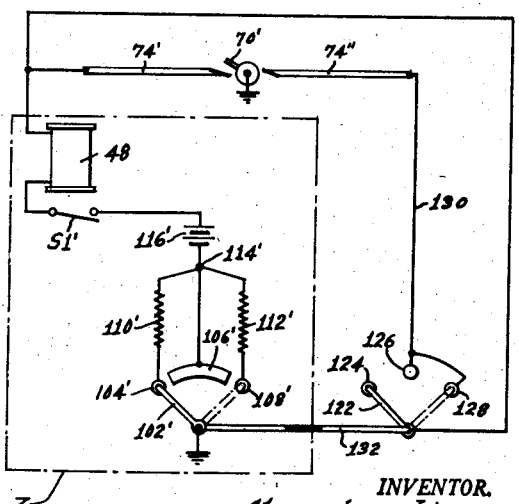
Fig. 20 is a circuit diagram of the speed changing means used in conjunction with the ratchet drive of Fig. 19.

The modification of Figure 19 is for use in conjunction with the switching system shown in Fig. 20. The circuitry enclosed in the area Z is in all respects identical to that shown in Fig. 18, the prime numerals in Fig. 20 representing the same elements identified by the corresponding numerals in Fig. 18. Accordingly, whenever contact pin 70' engages contact blade 74' (provided of course that starting switch S1' is closed), the circuit to the coil 48 will be complete. A movable contact 122 is mechanically linked for rotation in unison with movable contact 102' by means of insulated linkage 132. Contact 122 is movable from the full line position in Figure 38, in which it is in engagement with fixed contact 124, to the dashed line position, in which it is in engagement with fixed contact 128, there being an intermediate fixed contact 126. Fixed contact 128 is electrically linked to fixed contact 126, which is in turn connected to contact blade 74" by means of conductor 130.

From the foregoing explanation it will be apparent that when movable contact 122 is in engagement with fixed contact 124, contact blade 74" is not in the circuit. Such position of movable contact 122 corresponds to the full line position of movable contact 102' in which the ratchet drive operates with oscillations of only 90° of displacement, as previously described in connection with Figure 18, and in which only one impulse and one actuation of the ratchet wheel is obtained per cycle. Under these operating conditions, a sudden momentary lessening of the load might cause the oscillation amplitude to become greater than 90°, possibly 180°, and with the device of Figs. 2 and 3 such increased amplitude would cause an additional impulse to be given to the armature. The arrangement shown in Figure 20 will clearly prevent such undesirable additional impulse since the contact blade 74" is not in the circuit.

When the system is operating at the higher speed, movable contact 122 is in engagement with fixed contact 128 and contact blade 74" is in the circuit to permit the system to operate in identically the same manner as heretofore described in connection with Figure 18.

A ratchet drive having very desirable features can be obtained by utilizing the identical device shown in Figs. 2 and 3, with the elimination therein of ratchet wheel actuating spring A, resulting in a system having only two ratchet actuating springs, namely spring C mounted on the armature 38 and spring B mounted on the arm 44.

When such device having only ratchet wheel actuating springs B and C is utilized, it is capable of producing four actuations per cycle when the amount of current through the coil 48 of the electromagnet is of a magnitude which will cause an initial angular displacement of the armature and spindle in the counterclockwise direction of approximately 225 degrees. More specifically, the following takes place: (a) during the initial counterclockwise movement of the balance wheel from the starting point to the maximum displacement of 225 degrees spring C will cause actuation #1, (b) during the return clockwise movement to the maximum clockwise displacement of 225 degrees spring B will cause actuations #2 and #3, and (c) during the return counterclockwise movement to the starting point spring C will cause actuation #4.

The embodiment having only springs B and C has certain very desirable characteristics which make said embodiment very useful as a constant speed driving means. For example, it will be noted that, contrary to the embodiments previously described, due to the removal of spring A there is no movement of rotation imparted to the ratchet wheel at the very outset of the cycle, when the first impulse is given to the armature. Consequently, the system initiates its oscillation without any load thereon, and it isn't until after 180° of rotation has been effectuated, at which time the system has acquired a certain amount of momentum, that the ratchet wheel is engaged by spring C so as to have imparted thereto a movement of rotation. Also, the ratchet wheel will have imparted thereto four movements of rotation for a large range of oscillations. More specifically it has already been shown that with oscillations of the balance constituted by displacements of 225° from the initial point, four actuations of the ratchet wheel are produced; but it will also be apparent that if said system oscillates with larger displacements from the initial starting point, as for example 450°, there will still be only four movements of rotation imparted to the ratchet wheel. Thus if the embodiment with only springs B and C is used to drive a recorder at a relatively constant speed, said constant speed will be maintained even if there are sudden changes of load which might cause the balance to oscillate with a displacement much greater than 225°.

As has previously been stated, prior art ratchet drives of the type described have been operative to impart only one actuation to the ratchet wheel per cycle. According to the embodiment just described, there are four actuations imparted to the ratchet wheel for each cycle. Since the frequency of oscillation, of a given balance is the same regardless of the amplitude of oscillation, it will be apparent that such device is capable of producing an output rotational speed which is four times greater than that which would be provided by a ratchet drive in which only one actuation is provided per cycle.

Instead of utilizing the device having only springs B and C to increase the output rotational speed thereof, said device may be utilized to increase the output torque thereof by merely reducing the rotational speed of output shaft 16 in gear box 18 (Fig. 1) and correspondingly increasing the output torque so that such device is capable of driving larger loads than prior art devices at the same rotational speed.

Thus it is seen that the herein disclosed embodiments of novel ratchet drive means are well adapted to accomplish the objects of the present invention.

While I have shown and described the preferred embodiments of my invention in connection with oscillation amplitudes of particular values, such values were pinpointed only for purposes of explanation. In operation, said embodiments will be operative in the manner described for a given range of oscillation amplitudes not limited to the particular values set forth above. It will also be understood that various changes may be made without departing from the underlying idea or principles of the invention within the scope of the appended claims.

Having thus described my invention what I claim and desire to secure by Letters Patent, is:

1. A ratchet drive device comprising an oscillatable spindle carrying a pair of spaced members and a balance wheel oscillatable therewith, means for oscillating said spindle a plurality of actuating parts carried by one of said members and oscillatable therewith, an actuating part carried by the other of said members and oscillatable therewith, and a wheel having peripheral teeth coacting with said actuating parts, the parts carried by said one member being operative to impart a movement of rotation to said wheel when said spindle rotates in one direction and the part carried by said other member being operative to impart a movement of rotation to said wheel when said spindle rotates in the opposite direction.

2. A ratchet drive device comprising an oscillatable spindle carrying a pair of spaced members and a balance wheel oscillatable therewith, means for oscillating said spindle, a pair of actuating parts carried by one of said members and disposed at opposite sides of said spindle and oscillatable therewith, an actuating part carried by the other of said members and oscillatable therewith and a wheel coacting with said actuating parts, the actuating parts carried by said one member being operative to impart a movement of rotation to said wheel when said spindle rotates in one direction and the actuating part carried by said other member being operative to impart a movement of rotation to said wheel when said spindle rotates in the opposite direction, rotation of said wheel always being in the same direction.

3. A ratchet drive device comprising an oscillatable spindle carrying the armature of an electromagnet, an arm and a balance wheel oscillatable with said spindle, means for oscillating said spindle said arm being in spaced relation with said armature, a pair of actuating members mounted on said armature and disposed symmetrically about said spindle and oscillatable therewith, an actuating member mounted on said arm and oscillatable therewith, and a ratchet wheel disposed in the space between said arm and said armature in a plane parallel to the spindle axis and having peripheral teeth coacting with said actuating members, the actuating members mounted on said armature being operative to impart a movement of rotation to said wheel in a given direction when said spindle rotates in one direction and the actuating member mounted on said arm being operative to impart a movement of rotation to said wheel in the same given direction when said spindle rotates in the opposite direction, said actuating members comprising resilient springs having bent end portions biased toward the axis of rotation of said wheel, and means carried by said spindle and abutting said spring end portions for maintaining the latter in position to engage said peripheral teeth.

4. A ratchet drive device comprising an oscillatable spindle carrying a pair of spaced members and a balance wheel oscillatable therewith, means for oscillating said spindle, a plurality of actuating parts carried by one of said members and oscillatable therewith, an actuating part carried by the other of said members and oscillatable therewith and a wheel having peripheral teeth coacting with said actuating parts, the parts carried by said one member being operative to impart a movement of rotation to said wheel when said spindle rotates in one direction and the part carried by said other member being operative to impart a movement of rotation to said wheel when said spindle rotates in the opposite direction, said actuating parts imparting a given number of movements of rotation per cycle to said wheel when said device oscillates with a first predetermined amplitude and imparting a larger number of movements of rotation per cycle to said wheel when said device oscillates with a second predetermined amplitude.

5. A ratchet drive device comprising an oscillatable spindle carrying a member, an arm and a balance wheel oscillatable with said spindle, means for oscillating said spindle, said arm being in spaced relation with said member, a pair of actuating parts mounted on said member and disposed symmetrically about said spindle and oscillatable therewith, an actuating part mounted on said arm and oscillatable therewith, and a ratchet wheel disposed in the space between said arm and said member in a plane parallel to the spindle axis and having peripheral teeth coacting with said actuating parts, the actuating parts mounted on said member being operative to impart a movement of rotation to said wheel in a given direction when said spindle rotates in one direction and the actuating part mounted on said arm being operative to impart a movement of rotation to said wheel in the same given direction when said spindle rotates in the opposite direction, said actuating parts imparting a given number of movements of rotation per cycle to said wheel when said device oscillates with a first predetermined amplitude and imparting a larger number of movements of rotation per cycle to said wheel when said device oscillates with a second predetermined amplitude, and means for changing the oscillation of said device from one to the other of said predetermined amplitudes.

6. A ratchet drive device comprising an oscillatable spindle carrying the armature of an electromagnet, an arm and a balance wheel having spring means for giving the latter oscillatory movement, said arm being in spaced relation with said armature, a pair of actuating members mounted on said armature and disposed symmetrically about said spindle and oscillatable therewith, an actuating member mounted on said arm and oscillatable therewith, and a ratchet wheel disposed in the space between said arm and said armature in a plane parallel to the spindle axis and having peripheral teeth coacting with said actuating members, the actuating members mounted on said armature being operative to impart a movement of rotation to said wheel in a given direction when said spindle rotates in one direction and the actuating member mounted on said arm being operative to impart a movement of rotation to said wheel in the same given direction when said spindle rotates in the opposite direction, a pair of symmetrically disposed contact pins carried by said spindle and extending laterally thereof, a contact blade having an end portion disposed in the path of said contact pins for engagement therewith, said engagement being operative to energize said electromagnet and occurring only at the initial rest position of said armature and during rotation of said spindle in said one direction, and an end of the armature being adjacent the electromagnet air gap when said engagement occurs, whereby intermittent impulses are given to said armature to initiate and maintain the oscillations.

7. A ratchet drive device comprising an oscillatable spindle carrying the armature of an electromagnet, an arm and a balance wheel having spring means for giving the latter oscillatory movement, said arm being in spaced relation with said armature, a pair of actuating members mounted on said armature and disposed symmetrically about said spindle and oscillatable therewith, an actuating member mounted on said arm and oscillatable therewith, and a ratchet wheel disposed in the space between said arm and said armature in a plane parallel to the spindle axis and having peripheral teeth coacting with said actuating members, the actuating members mounted on said armature being operative to impart a movement of rotation to said wheel in a given direction when said spindle rotates in one direction and the actuating member mounted on said arm being operative to impart a movement of rotation to said wheel in the same given direction when said spindle rotates in the opposite direction, a pair of symmetrically disposed contact pins carried by said spindle and extending laterally thereof, a contact blade having an end portion disposed in the path of said contact pins for engagement therewith, said engagement being operative to energize said electromagnet and occurring only at the initial rest position of said armature and during rotation of said spindle in said one direction, and an end of the armature being adjacent the electromagnet air gap when said engagement occurs, whereby intermittent impulses are given to said armature to initiate and maintain the oscillations, said actuating members imparting a given number of movements of rotation per cycle to said wheel when said device oscillates with a first predetermined amplitude and imparting a larger number of movements of rotation per cycle to said wheel when said device oscillates with a second predetermined amplitude and means for changing the amount of current flowing through said electromagnet when energized for correspondingly changing the oscillations of said device from one to the other of said predetermined amplitudes.

8. A ratchet drive device comprising an oscillatable spindle carrying the armature of an electromagnet, an arm and a balance wheel having spring means for giving the latter oscillatory movement, said arm being in spaced relation with said armature, a pair of actuating members mounted on said armature and disposed symmetrically about said spindle and oscillatable therewith, an actuating member mounted on said arm and oscillatable therewith, and a ratchet wheel disposed in the space between said arm and said armature in a plane parallel to the spindle axis and having peripheral teeth coacting with said actuating members, the actuating members mounted on said armature being operative to impart a movement of rotation to said wheel in a given direction when said spindle rotates in one direction and the actuating member mounted on said arm being operative to impart a movement of rotation to said wheel in the same given direction when said spindle rotates in the opposite direction, said actuating members imparting one movement of rotation per cycle to said wheel when said spindle oscillates with an amplitude of approximately 90 degrees, 5 movements of rotation with an amplitude of approximately 225 degrees, and 7 movements of rotation with an amplitude of approximately 405 degrees.

9. A ratchet drive device comprising an oscillatable spindle carrying the armature of an electromagnet, an arm and a balance wheel having spring means for giving the latter oscillatory movement, said arm being in spaced relation with said armature, a pair of actuating members mounted on said armature and disposed symmetrically about said spindle and oscillatable therewith, an actuating member mounted on said arm and oscillatable therewith, and a ratchet wheel disposed in the space between said arm and said armature in a plane parallel to the spindle axis and having peripheral teeth coacting with said actuating members, the actuating members mounted on said armature being operative to impart a movement of rotation to said wheel in a given direction when said spindle rotates in one direction and the actuating member mounted on said arm being operative to impart a movement of rotation to said wheel in the same given direction when said spindle rotates in the opposite direction, a contact pin carried by said spindle and extending laterally thereof, a pair of contact blades symmetrically disposed about said spindle and each having an end portion disposed in the path of said contact pin for engagement therewith, said engagement being operative to energize said electromagnet and occurring only at the initial rest position of said armature and during rotation of said spindle in said one direction, and an end of the armature being adjacent the electromagnet air gap when said engagement occurs, whereby intermittent impulses are given to said armature to initiate and maintain the oscillations.

10. A ratchet drive device comprising an oscillatable spindle carrying the armature of an electromagnet, an arm and a balance wheel having spring means for giving the latter oscillatory movement, said arm being in spaced relation with said armature, a pair of actuating members mounted on said armature and disposed symmetrically about said spindle and oscillatable therewith, an actuating member mounted on said arm and oscillatable therewith, and a ratchet wheel disposed in the space between said arm and said armature in a plane parallel to the spindle axis and having peripheral teeth coacting with said actuating members, the actuating members mounted on said armature being operative to impart a movement of rotation to said wheel in a given direction when said spindle rotates in one direction and the actuating member mounted on said arm being operative to impart a movement of rotation to said wheel in the same given direction when said spindle rotates in the opposite direction, a contact pin carried by said spindle and extending laterally thereof, a pair of contact blades symmetrically disposed about said spindle and each having an end portion disposed in the path of said contact pin for engagement therewith, said engagement being operative to energize said electromagnet and occurring only at the initial rest position of said armature and during rotation of said spindle in said one direction, and an end of the armature being adjacent the electromagnet air gap when said engagement occurs, whereby intermittent impulses are given to said armature to initiate and maintain the oscillations, said actuating members imparting a given number of movements of rotation per cycle to said wheel when said device oscillates with a first predetermined amplitude and imparting a larger number of movements of rotation per cycle to said wheel when said device oscillates with a second predetermined amplitude, and means for changing the oscillations of said device from one to the other of said predetermined amplitudes.

11. A ratchet drive device comprising an oscillatable spindle carrying the armature of an electromagnet, an arm and a balance wheel having spring means for giving the latter oscillatory movement, said arm being in spaced relation with said armature, a pair of actuating members mounted on said armature and disposed symmetrically about said spindle and oscillatable therewith, an actuating member mounted on said arm and oscillatable therewith, and a ratchet wheel disposed in the space between said arm and said armature in a plane parallel to the spindle axis and having peripheral teeth coacting with said actuating members, the actuating members mounted on said armature being operative to impart a movement of rotation to said wheel in a given direction when said spindle rotates in one direction and the actuating member mounted on said arm being operative to impart a movement of rotation to said wheel in the same given direction when said spindle rotates in the opposite direction, a contact pin carried by said spindle and extending laterally thereof, a pair of contact blades symmetrically disposed about said spindle and each having an end portion disposed in the path of said contact pin for engagement therewith, said engagement being operative to energize said electromagnet and occurring only at the initial rest position of said armature and during oscillations of said spindle in said one direction, and an end of the armature being adjacent the electromagnet air gap when said engagement occurs, whereby intermittent impulses are given to said armature to initiate and maintain the oscillations, said actuating members imparting a given number of movements of rotation per cycle to said wheel when said device oscillates with a first predetermined amplitude and imparting a larger number of movements of rotation per cycle to said wheel when said device oscillates with a second predetermined amplitude, and means for changing the oscillations of said device from one to the other of said predetermined amplitudes, said last mentioned means being operative to disconnect one of said contact blades from the electromagnet circuit when said oscillations are changed from said one to said other of said predetermined amplitudes.

References Cited in the file of this patent

UNITED STATES PATENTS

| | | |
|---|---|---|
| 2,084,226 | Strahm | June 15, 1937 |
| 2,420,827 | Kennedy | May 20, 1947 |
| 2,598,912 | Held | June 3, 1952 |
| 2,600,754 | Gold | June 17, 1952 |

FOREIGN PATENTS

| | | |
|---|---|---|
| 504,365 | Great Britain | July 17, 1937 |
| 606,387 | Great Britain | Aug. 12, 1948 |